United States Patent [19]

Woodside

[11] Patent Number: 5,147,945
[45] Date of Patent: Sep. 15, 1992

[54] ORGANOSILICON POLYMERS AND PREPOLYMERS COMPRISING A COUPLING MONOMER

[75] Inventor: Andrew B. Woodside, Wilmington, Del. Raymond T. Leiberied, New Castle, Del.

[73] Assignee: Hercules Incorporated, Wilmington, Del.

[21] Appl. No.: 636,046

[22] Filed: Dec. 31, 1990

[51] Int. Cl.$^5$ .................................... C08F 283/00
[52] U.S. Cl. .................... 525/475; 525/477; 525/479
[58] Field of Search .................. 525/475, 477, 479

[56] References Cited

U.S. PATENT DOCUMENTS

| | | | |
|---|---|---|---|
| 4,855,378 | 8/1989 | Pradtl | 528/26 |
| 4,877,820 | 10/1989 | Cowan | 523/222 |
| 4,900,779 | 2/1990 | Leibfried | 524/862 |
| 4,902,731 | 2/1990 | Leibfried | 523/222 |

*Primary Examiner*—Melvyn I. Marquis
*Attorney, Agent, or Firm*—Mark D. Kuller

[57] ABSTRACT

Crosslinked or crosslinkable organosilicon polymers and prepolymers comprising either (i) alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has three or more reactive sites; or (ii) a linear poly(organohydrosiloxane) polymer having at least 30% of its ≡SiH groups reacted to hydrocarbon residues derived from polycyclic polyenes having at least two non-aromatic, non-conjugated carbon-carbon double bonds in their rings; wherein the polymer or prepolymer further comprises a coupling monomer having at least one carbon-carbon double bond which reacts with SiH during hydrosilation.

24 Claims, No Drawings

ORGANOSILICON POLYMERS AND PREPOLYMERS COMPRISING A COUPLING MONOMER

This invention is directed to novel organosilicon polymers and prepolymers comprising a coupling monomer.

BACKGROUND OF THE INVENTION

Leibfried, in U.S. Pat. Nos. 4,900,779 and 4,902,731 and U.S. patent application Ser. Nos. 07/419,429 (filed Oct. 10, 1989, now U.S. Pat. No. 5,013,809), 07/419,430 (filed Oct. 10, 1989, now U.S. Pat. No. 5,077,134), Bard and Burnier, in U.S. patent application Ser. Nos. 07/422,214 (filed Oct. 16, 1989, now U.S. Pat. No. 5,008,360), and Burnier, in 07/508,323 (filed Apr. 12, 1990, now U.S. Pat. No. 5,025,048), describe crosslinked organosilicon polymers and crosslinkable organosilicon prepolymers comprised of alternating polycyclic hydrocarbon residues and cyclic polysiloxanes or siloxysilane residues linked through carbon to silicon bonds. Cowan, in U.S. Pat. No. 4,877,820, and Burnier, in U.S. patent application Ser. No. 07/508,323, supra, disclose crosslinked or crosslinkable linear poly(organohydrosiloxane) polymers having at least 30% of their $\equiv$SiH groups reacted with hydrocarbon residues derived from polycyclic polyenes. The inventor has studied use of these compositions as coatings and as matricies for fiber reinforced composites. He has discovered that use of a coupling monomer improves adhesion of the prepolymers and polymers to surfaces and fiber reinforcement. In addition, he has discovered that certain materials coated with these polymers have improved surface properties and improved resistance to atomic oxygen attack.

SUMMARY OF THE INVENTION

Accordingly, this invention is directed to a crosslinked or crosslinkable organosilicon polymer or prepolymer comprising either (i) alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has three or more reactive sites; or (ii) a linear poly(organohydrosiloxane) polymer having at least 30% of its $\equiv$SiH groups reacted to hydrocarbon residues derived from polycyclic polyenes having at least two non-aromatic, non-conjugated carbon-carbon double bonds in their rings; wherein the polymer or prepolymer further comprises a coupling monomer having at least one carbon-carbon double bond which reacts with $\equiv$SiH during hydrosilation.

DETAILED DESCRIPTION OF THE INVENTION

Herein, "SiH" is be used to describe hydrosilation reactable $\equiv$SiH groups.

Any cyclic polysiloxane or tetrahedral siloxysilane with two or more hydrogen atoms bound to silicon can be used to form the crosslinked organosilicon polymers or hydrosilation crosslinkable organosilicon prepolymers of this invention. Cyclic polysiloxanes useful in forming the products of this invention have the general formula:

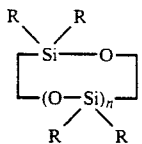

(I)

wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms in the molecule.

Examples of reactants of Formula (I) include, e.g., tetra- and penta-methylcyclotetrasiloxanes, tetra-, penta-, hexa- and hepta-methylcyclopentasiloxanes, tetra-, penta- and hexa-methylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

The tetrahedral siloxysilanes are represented by the general structural formula:

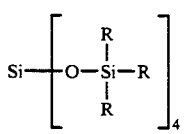

(II)

wherein R is as defined above and is hydrogen on at least two of the silicon atoms in the molecule.

Examples of reactants of Formula (II) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

The linear poly(organohydrosiloxane) preferably has the general formula:

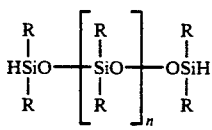

(III)

wherein R is a substituted or unsubstituted, saturated alkyl radical or a substituted or unsubstituted phenyl radical, and about 5% to about 50% of the R's are hydrogen and m is an integer from about 3 to 100, and the maximum value of m is preferably 40.

Exemplary linear poly(organohydrosiloxanes) include:
trimethylsiloxy-terminated dimethylsiloxanemethylhydrosiloxane copolymer,
dimethylsiloxy-terminated dimethylsiloxanemethylhydrosiloxane copolymer,
dimethylsiloxy-terminated polydimethylsiloxane,
trimethylsiloxy-terminated methyloctylsiloxanemethylhydro-siloxane copolymer,
dimethylsiloxy-terminated phenylmethylsiloxanemethylhydro-siloxane copolymer,
trimethylsiloxy-terminated methylcyanopropylsiloxane-methylhydrosiloxane copolymer, trimethylsiloxy-terminated 3,3,3-trifluoropropylmethylsiloxane methylhydrosiloxane copolymer,
trimethylsiloxy-terminated 3-aminopropylmethyl siloxane-methylhydrosiloxane copolymer,
trimethylsiloxy-terminated 2-phenylethylmethyl siloxane-methylhydrosiloxane copolymer, and
trimethylsiloxy-terminated 2-(4-methylphenyl)ethyl-methyl-siloxane-methylhydrosiloxane copolymer.

Polycyclic polyenes useful in preparing the composition of this invention are polycyclic hydrocarbon compounds having at least two non-aromatic, non-conjugated carbon-carbon double bonds. Illustrative are compounds selected from the group consisting of cyclopentadiene oligomers (e.g., dicyclopentadiene, tricyclopentadiene (also known as "cyclopentadiene trimer") and tetracyclopentadiene), dimethanohexahydronaphthalene, bicycloheptadiene (also known as "norbornadiene") and its diels-alder oligomers with cyclopentadiene (e.g., dimethanohexahydronaphthalene), norbornadiene dimer, and substituted derivatives of any of these, e.g., methyl dicyclopentadiene. Preferred are cyclopentadiene oligomers, such as dicyclopentadiene, methyl dicyclopentadiene and tricyclopentadiene. Most preferred is dicyclopentadiene. Two or more polycyclic polyenes can be used in combination.

Other monomers useful in this invention are described in U.S. patent application Ser. Nos. 07/419,429, 07/419,430 and 07/422,214, supra.

The preferred coupling monomers have the general formula:

$$AX(YR)_n R'_m \qquad (I)$$

wherein
A is a group containing at least one carbon-carbon double bond reactive in hydrosilation;
X is an atom selected from the group consisting of the atoms of groups IIIA, IVA, IIIB and IVB of the periodic chart except carbon;
Y is selected from the group consisting of nitrogen, oxygen, phosphorous and sulfur;
R and R' are independently selected from the group consisting of aliphatic and aromatic groups that do not interfere with hydrosilation and halogens;
n is an integer in the range of 1 to 3;
m is an integer in the range of 0 to 2;
the sum of m and n is less than or equal to 3.

A may be any aliphatic or aromatic group which optionally may contain ester, amide or other non-carbon linkages, but must contain at least one carbon-carbon double bond reactive in hydrosilation. A is preferably a linear or cyclic aliphatic group having 10 or less carbon atoms and containing one carbon-carbon double bond reactive in hydrosilation. Preferably the carbon-carbon double bond is a di or mono substituted vinyl group (e.g., 5-bicycloheptenyl group) and most preferably A is a vinyl group.

X is preferably B, Al, Si, Ge, Sn, Pb, Ti or Zr, more preferably Si or Ti, and most preferably Si.

Y is preferably oxygen or nitrogen, and most preferably oxygen.

R and R' are independently selected from the group consisting of aliphatic and aromatic groups that do not interfere with hydrosilation and halogens. R and R' should not interfere with polymer adhesion to materials (e.g., glass, metal, carbon (graphite)/epoxy, etc.). R is preferably a group that facilitates heterolysis of the Y—X bond, more preferably is selected from short chain alkyls and most preferably is methyl, ethyl or acetyl. R' is preferably a linear alkyl group having 10 or fewer carbon atoms (which may be bidentate), and is most preferably ethyl or methyl. The most preferred halogen is chloride.

Preferably n is 3 and m is 0.
Specific examples include the following:

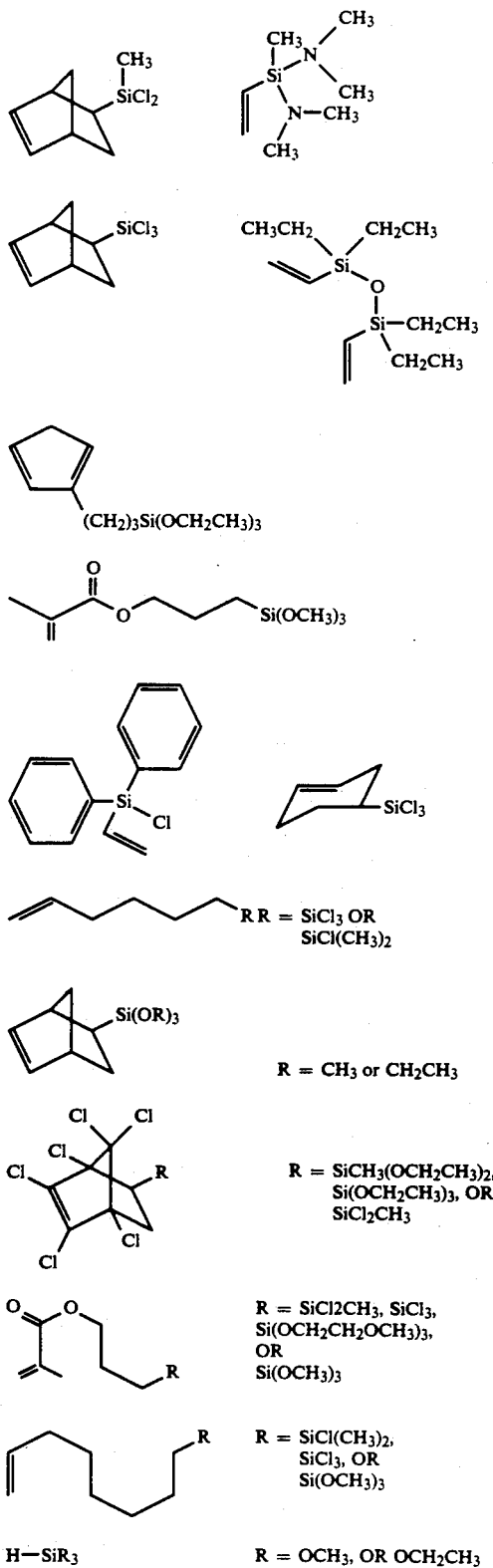

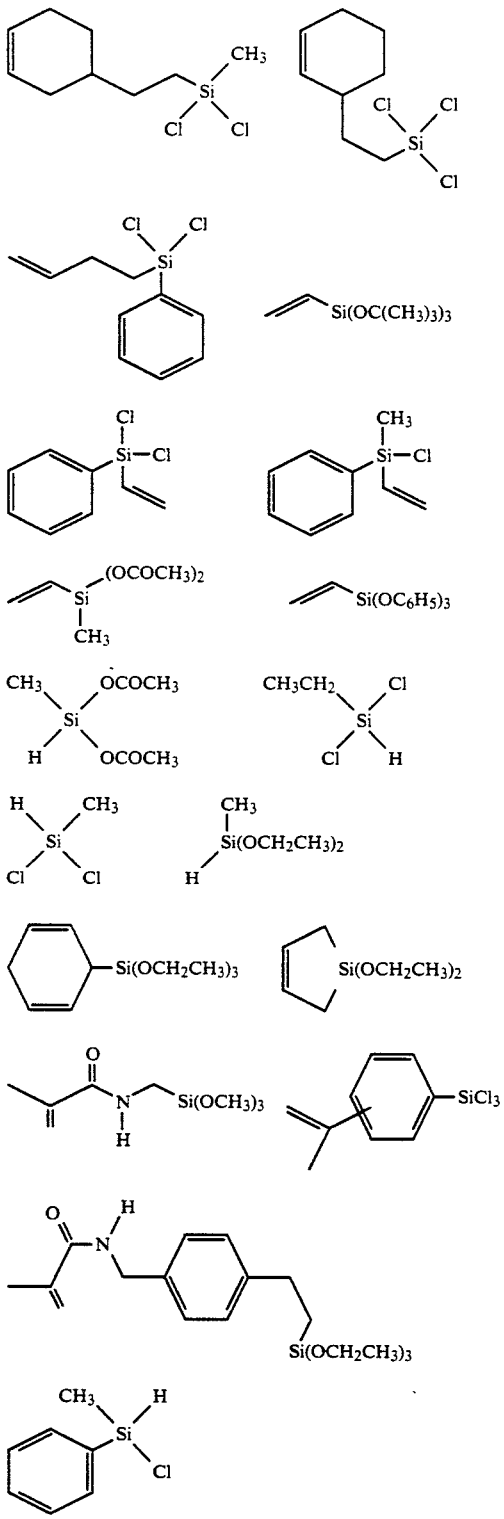

The most preferred coupling monomers are vinyltrimethoxysilane and vinyltriethoxysilane, with the latter being most preferred.

The ratio of carbon-carbon double bonds in the coupling monomer to SiH groups in the cyclic polysiloxanes, tetrahedral siloxysilane or poly(organohydrosiloxane) is in the range of 0.09:1 to 0.90:1, preferably 0.09:1 to 0.33:1, and more preferably 0.09:1 to 0.17:1.

In embodiment (i), the ratio of carbon-carbon double bonds in the rings of (a) to SiH groups in (b) is in the range of 0.75:1 to 0.08:1, preferably 0.75:1 to 0.5:1, and more preferably 0.75:1 to 0.67:1.

The reactions for forming the organosilicon prepolymers and polymers of this invention are described in U.S. Pat. Nos. 4,877,820, 4,900,779 and 4,902,731, and U.S. patent application Ser. Nos. 07/419,429, 07/419,430 and 07/422,219, supra. The reactions can be promoted thermally or by the addition of a hydrosilation catalyst or radical generators such as peroxides and azo compounds. Hydrosilation catalysts include metal salts and complexes of Group VIII elements. The preferred hydrosilation catalysts contain platinum (e.g., $PtCl_2$, dibenzonitrile platinum dichloride, platinum on carbon, etc.). The preferred catalyst, in terms of both reactivity and cost, is chloroplatinic acid ($H_2PtCl_6.6H_2O$). Catalyst concentrations of 0.0005 to about 0.05% by weight of platinum, based on the weight of the monomers, are preferred.

To prepare the polymers and prepolymers, several approaches are available. It is possible, by selection of reactants, reactant concentrations and reaction conditions, to prepare products exhibiting a broad range of properties and physical forms.

In one approach, the correct relative ratios of reactants and the platinum catalyst are simply mixed and brought to a temperature at which the reaction is initiated and proper temperature conditions are thereafter maintained to drive the reaction to substantial completion.

B-stage type prepolymers can be prepared with cyclic polysiloxanes or tetrahedral siloxysilanes as disclosed in U.S. Pat. Nos. 4,900,779 and 4,902,731, supra. Generally, the initial product of the reaction at lower temperatures, e.g., about 25° to about 80° C., is a crosslinkable prepolymer, which may be in the form of a solid or a flowable, heat-curable liquid, even though the ratio of carbon-carbon double bonds to SiH groups is otherwise suitable for cross-linking. The prepolymers generally have 30 to 70% of the SiH groups reacted, and when liquids are desired preferably about 30 to 60% of the SiH groups reacted. Such prepolymers, analogous to the so-called B-stage resins encountered in other thermoset preparations, can be recovered and subsequently transferred to a mold for curing. They can also be used for coating, using conventional techniques.

Flowable, heat-curable polymers, analogous to the B-stage resins, can be prepared with the poly(organohydrosiloxanes) as described in U.S. patent application Ser. No. 4,877,820.

The flowable prepolymers and crosslinkable polymers are prepared using polycyclic polyenes having at least two chemically distinguishable non-aromatic, non-conjugated carbon-carbon double bonds in their rings. Illustrative are compounds selected from the group consisting of dicyclopentadiene, asymmetrical tricyclopentadiene, and methyl dicyclopentadiene, and substituted derivatives of any of these. Preferred is dicyclopentadiene.

The prepolymers and crosslinkable polymers are stable at room temperature for varying periods of time, and cure upon reheating to an appropriate temperature, e.g., about 100° to about 280° C. Often, additional catalyst is added to the prepolymer prior to cure to further promote the reaction.

According to one process for preparing the polymers and prepolymers of this invention, the coupling monomer is combined with the polycyclic polyene and, then, the mixture is added to a solvent that contains the catalyst. The coupling monomer is preequililibrated with the catalyst before the addition of the methylhydrocyclosiloxanes. A substantial portion of the coupling monomer double bonds react with the SiH groups before the double bonds of the polycyclic polyene and at B-stage, essentially all of the coupling monomer double bonds have been consumed. Alternatively, the coupling monomer may be prereacted with the cyclic polysiloxanes, tetrahedral siloxysilanes or poly(organohydrosiloxanes) until all of the coupling monomer double bonds have reacted. Addition of dicyclopentiadiene at this point will give B-stage resin.

The reaction speed and its accompanying viscosity increase can be controlled by use of a cure rate retardant (complexing agent), such as ethylenediamine, N,N'-dimethylethylenediamine, N,N'-diethylethylenediamine, N,N,N',N'-tetramethylethylenediamine, diethylenetriamine or phosphorus compounds.

Coating may be carried out using conventional means. A solution is prepared by dissolving the liquid prepolymer or crosslinkable polymers in a solvent such as heptane or hexane, tetrahydrofuran, and toluene, preferably hexane in a concentration of 20 to 40%, preferably 28 to 33%, by weight. Then, the resultant solution is coated on the object by conventional techniques, such as dipping, spinning, or flat-flow techniques (the latter providing the best results), and the prepolymer is cured in place.

Additives such as fillers and pigments are readily incorporated. Carbon black, vermiculite, mica, wollastonite, calcium carbonate, silica, fumed silica, fused silica, glass spheres, glass beads, ground glass and waste glass are examples of fillers which can be incorporated. Fillers can serve either as reinforcement or as fillers and extenders to reduce the cost of the molded product. Glass spheres are useful for preparing low density composites. When used, fillers can be present in amounts up to about 85%.

Glass and carbon (e.g., graphite) fibers are wetted very well by the liquid prepolymers and crosslinkable polymers making them excellent matrix materials for high strength composite structures. Thus a mold containing the requisite staple or continuous filament can be charged with the prepolymer/crosslinkable polymer and the prepolymer/crosslinkable polymer cured to form the desired composite structure. Fiber in fabric form can also be employed. In addition, solid thermoplastic polymers may be melted, poured over such fibers, and heated to form composites or thermoplastic polymer powders may be blended with such fibers and, then, heated to form a composite. Fiber reinforced composites of the polymers of this invention can contain as much as 80%, preferably 30 to 60%, by weight, of fibrous reinforcement, and, when fully cured, typically exhibit high tensile and flexural properties and also excellent impact strength. The compositions are also useful as matrix materials for ceramic, metallic, aramid and synthetic polymer reinforced composites.

The polymers and prepolymers or this invention make excellent coatings for glass, metals, carbon (e.g., graphite) and reinforced composites (e.g., graphite/epoxy composites). For instance, the crosslinked polymers are useful as a planarizing agents for graphite/epoxy objects. The coupling monomer improves adhesion of the crosslinked polymers to the material surfaces.

Thermal properties of the thermoset polymers are outstanding. The glass transition temperature (Tg) of a fully cured thermoset polymer is about 200° C. or higher. Thermal stability is excellent with usually less than 10% weight loss at 500° C. during Thermogravimetric analysis. At 1000° C. in air, they leave about 50% of a ceramic residue. This high temperature resistance makes them useful as refractory materials, fire resistant materials and ablative materials. Graphite/epoxy panels coated with this resin have been cycled in and out of liquid nitrogen. The resin remained glass-like and did not crack after several cycles of this extreme temperature range.

The thermoset polymers are also resistant to oxidation at ordinary temperatures. Above 200° C., oxidative crosslinking of silicon portions of the molecule appears to take place, resulting in the formation of a dark siliceous outer layer. This oxidized outer layer appears to impede the oxidative degradation of the bulk polymer. Objects, particularly those made with graphite/epoxy composites, coated with the polymers of this invention have improved resistance to atomic oxygen attack. The polymers are especially useful as planarizing agents for objects such as graphite/epoxy composite space mirrors for low earth orbit as the polymers serve to prevent oxidation of the composite materials.

This resin system has good moisture resistance. When cured samples of neat resin are placed in boiling water for extended periods of time, the resin loses 3% of its mass, and becomes cloudy. Once the initial mass loss has occurred, no additional mass loss takes place.

The following examples are presented to demonstrate this invention. They are not intended to be limiting. Therein, all percentages, parts, etc., are by weight unless otherwise indicated.

EXAMPLE 1

This example shows preparation of a polymer of this invention.

A clean, dried reaction vessel, having a nitrogen atmosphere, was charged with 0.015 parts chloroplatinic acid in isopropanol (20 grams/liter solution). Then, 9.70 parts vinyltriethoxysilane and 29.26 parts dicyclopentadiene were injected into the vessel and the mixture was stirred for 30 minutes. Hexane (24.26 parts) was added and the mixture was stirred for an additional 30 minutes. Next, 36.76 parts of methylhydrocyclosiloxanes dissolved in hexane (1 gram/milliliter solution) was injected and the reaction vessel was heated to 50° C. and stirred for an hour. The resulting yellow solution was poured into an aluminum pan and heated to drive off the solvent. Then, the sample was cured at 110° C. for twelve hours to form a crosslinked polymer. The resulting product was clear with a smooth, hard surface.

EXAMPLE 2

This example shows preparation of a polymer of this invention.

The procedures of Example 1 were repeated using 17.66 parts vinyltriethoxysilane and 24.61 parts dicyclopentadiene. The resulting product was clear with a smooth, hard surface.

EXAMPLE 3

This example shows preparation of a polymer of this invention.

The procedures of Example 1 were repeated using 31.75 parts vinyltriethoxysilane and 16.56 parts dicyclopentadiene. The resulting product was clear with a smooth, hard surface.

EXAMPLE 4

This example shows preparation of a polymer of this invention.

A clean, dried reaction vessel, having a nitrogen atmosphere, was charged with 0.050 parts chloroplatinic acid, 27.44 parts vinyltriethoxysilane and 38 parts dicyclopentadiene and the mixture was stirred for 1 hour until it appeared gold. Heptane (51.28 parts) was added and the mixture was stirred for an additional 60 minutes. Next, 44.8 parts of methylhydrocyclosiloxanes dissolved in heptane (0.6 gram/milliliter solution) was injected. The reaction was maintained at 30° to 35° C. for 20 minutes, and 35° to 45° C. for the next 20 minutes, and 45° C. for the hour thereafter. The resulting yellow solution was poured into an aluminum pan and heated to drive off the solvent. Then, the sample was cured at 110° C. for twelve hours to form a crosslinked polymer. The resulting product was clear with a smooth, hard surface.

EXAMPLE 5

This example shows preparation of a prepolymer of this invention.

A clean, dried reaction vessel, having an argon atmosphere, was charged with 0.03 parts chloroplatinic acid. Then, 5.33 parts vinyltrimethoxysilane and 9.5 parts dicyclopentadiene were injected into the vessel and the mixture was stirred for 2 hours. Next, 11.2 parts of methylhydrocyclosiloxanes dissolved in n-heptane (0.224 gram/milliliter solution) was injected and the reaction vessel was allowed to heated to 55° C., at which point the reaction was slowly cooled to 20° C. Three additional times the reaction was allowed to heat to 55° C. and then was cooled to 20° C. Then, the reaction was allowed to proceed until the heat of reaction was no longer sufficient to heat the reaction mixture, at which point the reaction mixture was heated to 50° C. for six hours. After cooling to room temperature, the homogeneous pale yellow solution was diluted with n-heptane to form a 26% weight/volume, prepolymer solution.

EXAMPLE 6

This example shows coating a graphite epoxy composite, with the polymer of this invention and, then, aluminum to form a mirror.

A 2 inch by 2 inch by 8 ply, resin rich graphite/epoxy composite sample was cleaned by standard optics techniques involving a series of hexane rinses and drag-wiping using absolute, glass-distilled ethanol (previously filtered through a 0.45 micron filter). The sample was placed in an oven (100° C.) for at least one hour to remove residual water and complete drying. Then, the sample was transferred to a nitrogen-purged container for storage and coating. The sample was positioned on a leveled, aluminum tool (0.003 inch flatness) that had been coated with release agent and held in place by spring-loaded clips pressing glass slides over the edge of the sample.

A coating solution was prepared by filtering 50 ml of the prepolymer prepared in Example 4 (having had the reaction solvent stripped) through a 0.45 micron nylon acrodisc. UV grade hexane was filtered in the same manner and mixed with the prepolymer. The mixture was filtered in the same manner.

A pipet containing 22.7% (w/v) prepolymer in hexane was dispersed just above the center of the sample and allowed to flow over the entire surface. The sample was heated on a hot plate at 30°-32° C. for 15 minutes to remove solvent. (The solution was noticeably more viscous after 30 seconds.) The sample was cured in an oven (100° C.), under nitrogen purge, for two hours. The resultant planarized sample was coated with aluminum by a sputtering process under vacuum. Adhesion of the aluminum was found to be excellent when measured using the tape test of ASTM-D 3359-83. The coating had a glossy surface, with very small defects and had virtually the same appearance after cure.

While the invention has been described with respect to specific embodiments, it should be understood that they are not intended to be limiting and that many variations and modifications are possible without departing from the scope and spirit of this invention.

What is claimed is:

1. A crosslinked or crosslinkable organosilicon polymer or prepolymer comprising either (i) alternating (a) cyclic polysiloxane or tetrahedral siloxysilane residues and (b) polycyclic hydrocarbon residues derived from polycyclic polyenes having at least two non-aromatic, non-conjugated carbon-carbon double bonds in their rings linked through carbon to silicon bonds, wherein at least one of the cyclic polysiloxanes or tetrahedral siloxysilanes (a) or the polycyclic polyenes (b) used to form the polymer or prepolymer has three or more reactive sites; or (ii) a linear poly(organohydrosiloxane) polymer having at least 30% of its $\equiv$SiH groups reacted to hydrocarbon residues derived from polycyclic polyenes having at least two non-aromatic, non-conjugated carbon-carbon double bonds in their rings; wherein the polymer or prepolymer further comprises a coupling monomer having at least one carbon-carbon double bond which reacts with $\equiv$SiH during hydrosilation.

2. The crosslinked or crosslinkable organosilicon polymer or prepolymer of claim 1 wherein the coupling monomer has the general formula:

$$AX(YR)_nR'_m \qquad (I)$$

wherein

A is a group containing at least one carbon-carbon double bond reactive in hydrosilation;

X is an atom selected from the group consisting of the atom of groups IIIA, IVA, IIIB and IVB of the periodic chart except carbon;

Y is selected from the group consisting of nitrogen, oxygen, phosphorous and sulfur;

R and R' are independently selected from the group consisting of halogens, and aliphatic and aromatic groups that do not interfere with hydrosilation;

n is an integer in the range of 1 to 3;

m is an integer in the range of 0 to 2;

the sum of m and n is less than or equal to 3.

3. The crosslinked or crosslinkable organosilicon polymer or prepolymer as claimed in claim 1 wherein the ratio of carbon-carbon double bonds in the coupling monomer to $\equiv$SiH groups in the cyclic polysiloxane, tetrahedral siloxysilane or poly(organohydrosiloxane) is 0.09:1 to 0.90:1.

4. The crosslinked or crosslinkable organosilicon polymer or prepolymer as claimed in claim 1 wherein the ratio of carbon-carbon double bonds in the rings of (a) to $\equiv$SiH groups in (b) is in the range of 0.75:1 to 0.08:1.

5. The crosslinked or crosslinkable organosilicon polymer or prepolymer of claim 2 wherein A is a linear or cyclic aliphatic group having 10 or less carbon atoms and one carbon-carbon double bond reactive in hydrosilation.

6. The crosslinked or crosslinkable organosilicon polymer or prepolymer of claim 2 wherein A is a vinyl group.

7. The crosslinked or crosslinkable organosilicon polymer or prepolymer of claim 2 wherein X is selected from the group consisting of B, Al, Si, Ge, Sn, Pb, Ti and Zr.

8. The crosslinked or crosslinkable organosilicon polymer or prepolymer of claim 2 wherein X is selected from the group consisting of Si and Ti.

9. The crosslinked or crosslinkable organosilicon polymer or prepolymer of claim 2 wherein Y is oxygen or sulfur.

10. The crosslinked or crosslinkable organosilicon polymer or prepolymer of claim 2 wherein Y is oxygen.

11. The crosslinked or crosslinkable organosilicon polymer or prepolymer of claim 2 wherein R and R' are independently selected from the group consisting of halogens, and aliphatic and aromatic groups that do not interfere with hydrosilation and coupling with glass or metal.

12. The crosslinked or crosslinkable organosilicon polymer or prepolymer of claim 2 wherein R is selected from the group consisting of methyl, ethyl, acetyl and chloride.

13. The crosslinked or crosslinkable organosilicon polymer or prepolymer of claim 2 wherein R' is selected from the group consisting of methyl and ethyl.

14. The crosslinked or crosslinkable organosilicon polymer or prepolymer of claim 13 wherein R' is selected from the group consisting of methyl and ethyl.

15. The crosslinked or crosslinkable organosilicon polymer or prepolymer of claim 2 wherein n is 3 and m is 0.

16. The crosslinked or crosslinkable organosilicon polymer or prepolymer of claim 2 wherein A is a linear or cyclic aliphatic group having 10 or less carbon atoms; X is selected from the group consisting of B, Al, Si, Ge, Sn, Pb, Ti and Zr; Y is oxygen or sulfur; R is selected from the group consisting of methyl, ethyl, acetyl and chloride; R' selected from the group consisting of methyl, ethyl and chloride; and the ratio of carbon-carbon double bonds in the rings of (a) to ≡SiH groups in (b) is in the range of 0.75:1 to 0.5:1 and the ratio of carbon-carbon double bonds in (c) to ≡SiH groups in (b) is in the range of 0.09:1 and 0.33:1.

17. The crosslinked or crosslinkable organosilicon polymer or prepolymer of claim 16 wherein X is selected from the group consisting of Si and Ti.

18. The crosslinked or crosslinkable organosilicon polymer or prepolymer of claim 16 wherein n is 3 and m is 0.

19. The crosslinked or crosslinkable organosilicon polymer or prepolymer of claim 4 wherein the coupling monomer (c) is vinyltrimethoxysilane.

20. The crosslinked or crosslinkable organosilicon polymer or prepolymer of claim 4 wherein the coupling monomer (c) is vinyltriethoxysilane.

21. A crosslinked organosilicon polymer or crosslinkable organosilicon prepolymer which is the hydrosilation reaction product of:
(a) a polycyclic polyene having at least two non-aromatic, non-conjugated carbon-carbon double bonds in its rings;
(b) a cyclic polysiloxane or tetrahedral siloxysilane having at least two ≡SiH groups; and
(c) a coupling monomer having at least one carbon-carbon double bond which reacts with ≡SiH during hydrosilation; wherein at least one of (a) or (b) has three or more reactive groups.

22. The crosslinked organosilicon polymer or crosslinkable organosilicon prepolymer of claim 21 wherein the coupling monomer has the general formula:

$$AX(YR)_n R'_m \qquad (I)$$

wherein
A is a group containing at least one carbon-carbon double bond reactive in hydrosilation;
X is an atom selected from the group consisting of the atom of groups IIIA, IVA, IIIB and IVB of the periodic chart except carbon;
Y is selected from the group consisting of nitrogen, oxygen, phosphorous and sulfur;
R and R' are independently selected from the group consisting of halogens, and aliphatic and aromatic groups that do not interfere with hydrosilation;
n is an integer in the range of 1 to 3;
m is an integer in the range of 0 to 2;
the sum of m and n is less than or equal to 3;
wherein the ratio of carbon-carbon double bonds in the coupling monomer to ≡SiH groups in the cyclic polysiloxane, tetrahedral siloxysilane or poly(organohydrosiloxane) is 0.09:1 to 0.90:1, and the ratio of carbon-carbon double bonds in the rings of (a) to ≡SiH groups in (b) is in the range of 0.75:1 to 0.08:1.

23. The crosslinked organosilicon polymer or crosslinkable organosilicon prepolymer of claim 21 wherein (b) is a cyclic polysiloxane.

24. The crosslinked organosilicon polymer or crosslinkable organosilicon prepolymer of claim 22 wherein (b) is a cyclic polysiloxane.

* * * * *

UNITED STATES PATENT AND TRADEMARK OFFICE
CERTIFICATE OF CORRECTION

PATENT NO. : 5,147,945

DATED : September 15, 1992

INVENTOR(S) : Andrew B. Woodside and Raymond T. Leibfried

It is certified that error appears in the above-identified patent and that said Letters Patent is hereby corrected as shown below:

On the cover sheet opposite Inventor, "Raymond T. Leiberied" should read --Raymond T. Leibfried--.

Signed and Sealed this

Twenty-first Day of September, 1993

Attest:

BRUCE LEHMAN

*Attesting Officer*   *Commissioner of Patents and Trademarks*